(12) United States Patent
Boyd

(10) Patent No.: US 9,090,153 B1
(45) Date of Patent: Jul. 28, 2015

(54) RAIN SHIELD FOR VEHICLE PASSENGERS

(71) Applicant: Michael Boyd, Clearwater, FL (US)

(72) Inventor: Michael Boyd, Clearwater, FL (US)

( * ) Notice: Subject to any disclaimer, the term of this patent is extended or adjusted under 35 U.S.C. 154(b) by 0 days.

(21) Appl. No.: 14/269,913

(22) Filed: May 5, 2014

(51) Int. Cl.
*B60J 11/06* (2006.01)

(52) U.S. Cl.
CPC .................................. *B60J 11/06* (2013.01)

(58) Field of Classification Search
CPC ........... B60J 11/00; B60J 11/02; B60J 11/025
USPC .............. 296/99.1, 152; 160/22, 23.1, 24, 29, 160/370.21, 370.22, 370.23
See application file for complete search history.

(56) References Cited

U.S. PATENT DOCUMENTS

| | | | |
|---|---|---|---|
| 2,426,113 A | 8/1947 | Northcutt | |
| 4,201,412 A | 5/1980 | Williams et al. | |
| 4,378,888 A | 4/1983 | Reed | |
| 4,807,920 A | 2/1989 | Fujiki et al. | |
| 4,848,827 A | 7/1989 | Ou | |
| 4,997,021 A * | 3/1991 | Brutsaert | 160/22 |
| 5,230,545 A | 7/1993 | Huang et al. | |
| 5,476,302 A | 12/1995 | Ronci | |
| 5,725,004 A | 3/1998 | Moulder | |
| 5,800,004 A | 9/1998 | Ackeret | |
| 6,019,414 A | 2/2000 | Pourciau, Sr. | |
| 6,044,856 A | 4/2000 | Cano | |
| 6,341,811 B1 | 1/2002 | Schoelkopf | |
| D492,640 S | 7/2004 | Greene et al. | |
| 6,948,766 B1 | 9/2005 | Capote et al. | |
| 7,086,684 B2 * | 8/2006 | Glaser et al. | 296/99.1 |
| 7,604,281 B1 | 10/2009 | Raynor | |
| 7,641,259 B2 | 1/2010 | Teshima et al. | |
| 7,819,458 B2 | 10/2010 | Raynor | |
| 8,240,323 B2 | 8/2012 | Lee | |
| 8,276,607 B2 | 10/2012 | Kim | |
| 8,387,640 B2 | 3/2013 | Kim | |
| 2003/0192581 A1 | 10/2003 | Chang | |
| 2007/0241586 A1 | 10/2007 | Clark | |
| 2010/0078960 A1 | 4/2010 | Raynor | |
| 2011/0010920 A1 | 1/2011 | Raynor | |
| 2011/0240074 A1 | 10/2011 | Kim | |
| 2012/0060345 A1 | 3/2012 | Raynor | |

FOREIGN PATENT DOCUMENTS

| | | | |
|---|---|---|---|
| JP | 2009-234554 | * | 10/2009 |
| KR | 20030004977 | * | 1/2003 |

* cited by examiner

*Primary Examiner* — Dennis H Pedder
(74) *Attorney, Agent, or Firm* — Nilay J. Choksi; Ronald E. Smith; Smith & Hopen, P.A.

(57) ABSTRACT

An apparatus that provides protection from precipitation to a vehicle occupant upon entering or exiting the vehicle includes a housing secured to the vehicle roof so that it can be reached by a passenger seated within the vehicle. A housing base is secured to the vehicle roof. A hinge positioned at the leading end of the housing interconnects the housing base to a housing cover. The housing has a fully closed position when the housing cover fully engages the housing base and a fully deployed position when the cover is fully rotated with respect to the base. A sheet of waterproof material has a first end secured to an interior of the base and a second end secured to an interior of the cover. The sheet is folded when the housing is in the fully closed position and is unfolded when the housing is in the fully deployed position.

5 Claims, 16 Drawing Sheets

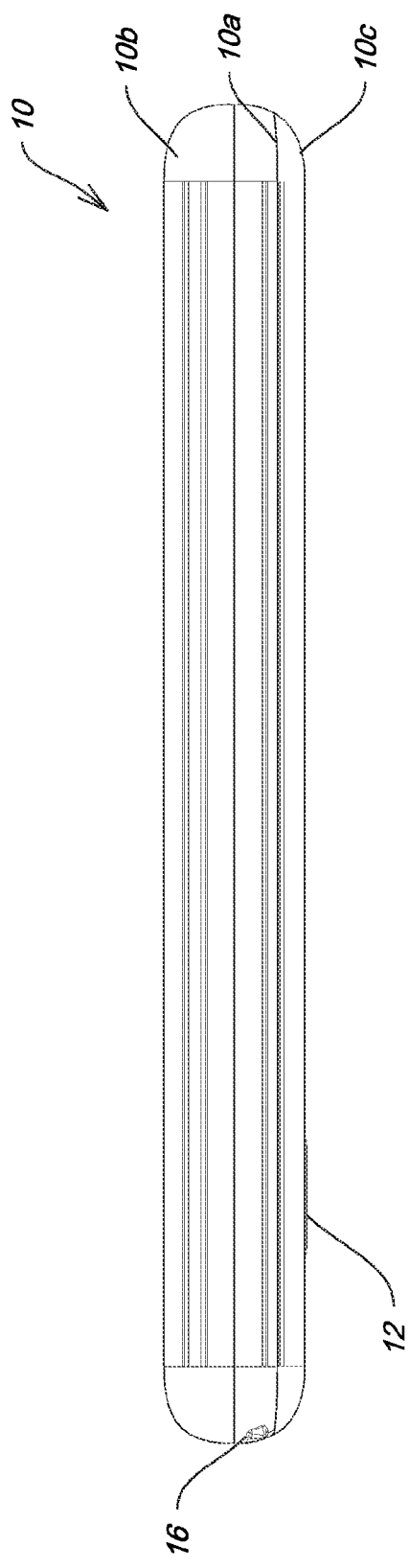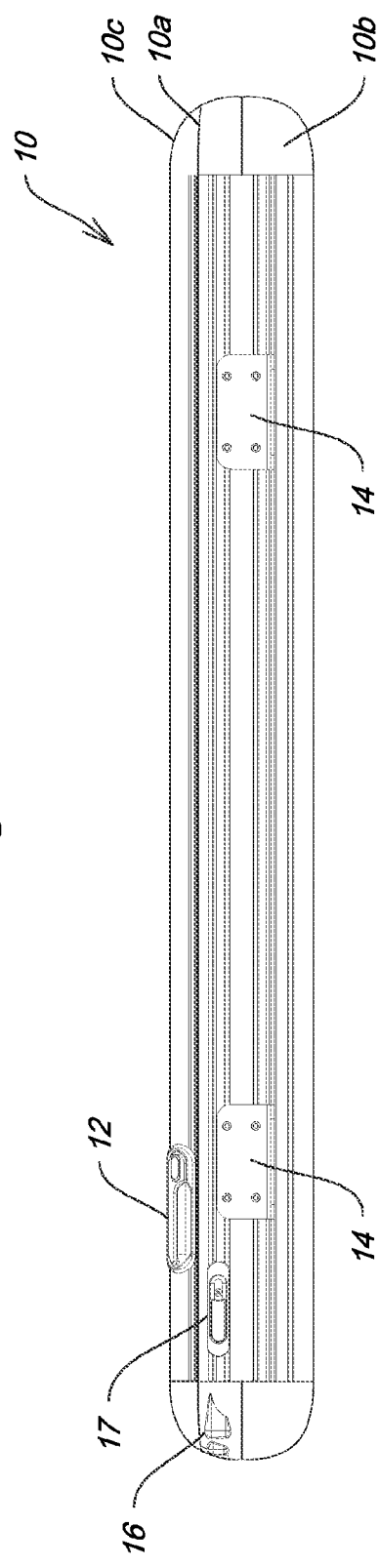
Fig. 1A
Fig. 1B

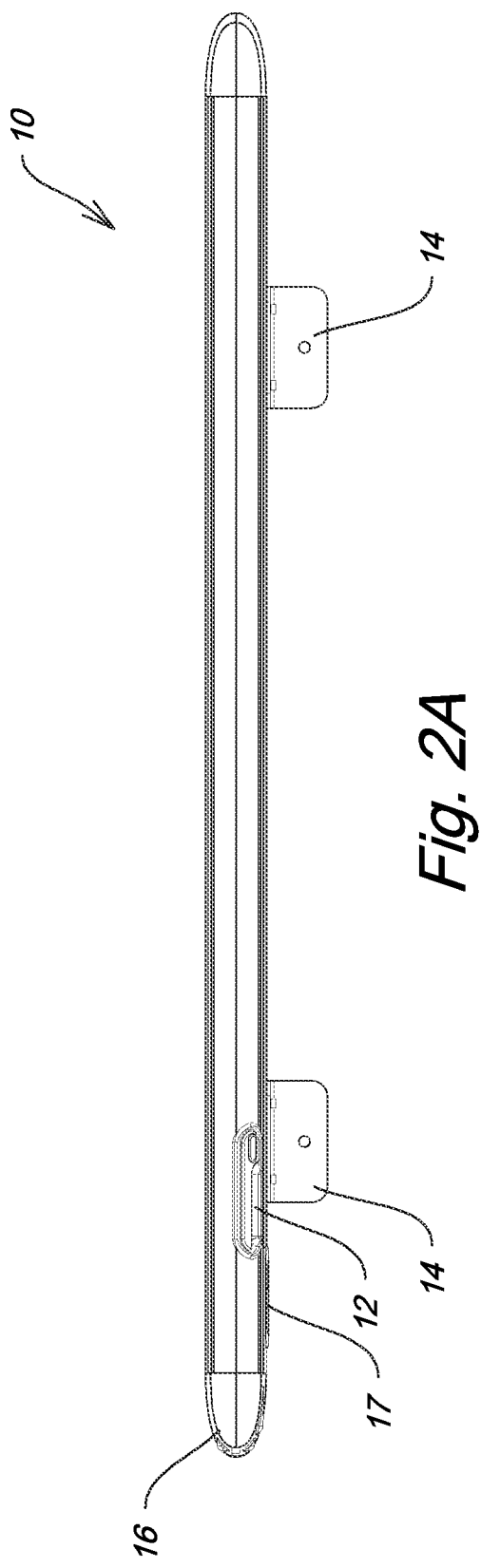
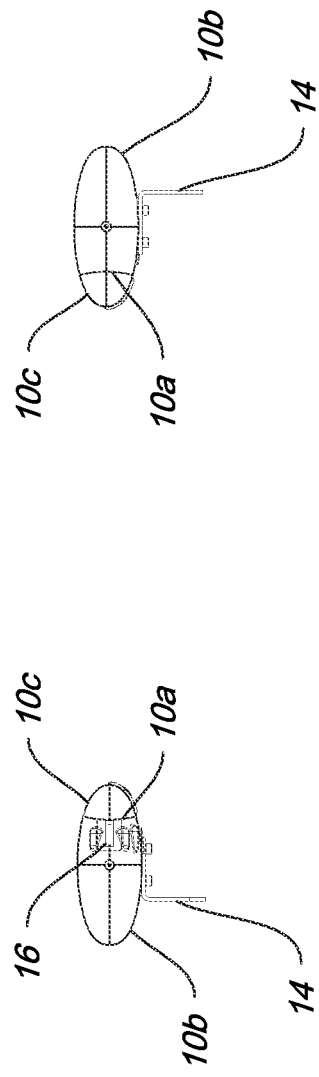
Fig. 2A
Fig. 2B
Fig. 2C

RAIN SHIELD FOR VEHICLE PASSENGERS

BACKGROUND OF THE INVENTION

1. Field of the Invention

This invention relates, generally, to automotive accessories. More particularly, it relates to an umbrella-like structure that can be deployed when needed by a passenger in a vehicle.

2. Description of the Prior Art

Most of the known umbrella-like devices that are attachable to vehicles have a first end anchored to the roof of the vehicle and a second end attached to a door. Accordingly, the umbrella-like device deploys when the door is opened, even if no rain is falling. Some of these devices enable a passenger to disable the device prior to opening the doors so that the device remains un-deployed when the door opens.

One drawback of such devices is that they provide a rain shield only in the area swept out by the door when opened, i.e., the protection stops at the trailing edge of the door.

Another type of device provides a greater coverage area. Devices of this type are rather large and cover substantially all of a vehicle's roof. They are deployed in cantilever fashion so that they project from the roof, extending over the side of the vehicle and shielding an area larger than that of the door-connected shields.

The primary drawback of the large devices is that they are so large they cannot be provided for all four doors of a four-door vehicle. A secondary drawback is that their large size renders them unsightly. Moreover, they are strictly utilitarian structures with no aesthetic appeal.

Thus there is a need for an umbrella-like rain shield device that is small and which does not detract from the appearance of a vehicle to which it is mounted. The needed device should cover an area larger than the area swept out by an open door and it should be mountable over each door of a vehicle so that all passengers will enjoy rain protection when needed.

However, in view of the art considered as a whole at the time the present invention was made, it was not obvious to those of ordinary skill in the art how the needed structure could be provided.

SUMMARY OF THE INVENTION

The long-standing but heretofore unfulfilled need for a device that protects vehicle occupants from rain or other forms of precipitation as they enter or leave the vehicle, providing ample dry space within which to close or deploy a conventional umbrella, is now met by a new, useful, and non-obvious invention.

The novel apparatus includes an elongate, streamlined housing having a leading end and a trailing end that correspond to a leading and trailing end of the vehicle. The housing has a longitudinal axis parallel to a longitudinal axis of the vehicle and is secured to the roof of the vehicle near an edge of the roof in proximity to a vehicle door so that the housing can be reached by a passenger standing next to the vehicle's door or by a passenger seated within the vehicle.

The housing includes a hollow base and a hollow cover. The hollow housing base is secured to either the vehicle roof or to accessory rails on the roof. A hinge is positioned at the leading end of the housing and performs the function of interconnecting the hollow housing cover and the hollow housing base to one another.

The housing has a fully closed position when the housing cover is fully engaged to the housing base and has a fully deployed position when the housing cover is fully rotated with respect to the housing base.

A sheet of waterproof material such as the material used in conventional umbrellas has a first end secured to an interior of the housing base and a second end secured to an interior of the housing cover. The sheet is in a folded or wound-up/coiled configuration when the housing is in its fully closed position and is fully unfolded or unwound when the housing is in its fully deployed position.

A first latch is secured to the trailing end of the housing cover and a first catch is secured to the trailing end of the housing base. The housing is therefore held in its closed position when the first latch and catch releasably engage one another.

An elongate rod has a leading end that engages a handle that is pivotally mounted to the housing cover at a leading end of the housing cover. The trailing end of that elongate rod engages the catch formed in the trailing end of the housing cover. Activation of the handle, i.e., rotation of the handle about a pivot point, displaces the elongate rod along its longitudinal axis of symmetry in a trailing-to-leading direction, thereby disengaging the trailing end of the elongate rod from the catch and thereby releasing the latch formed in the trailing end of the housing cover so that the cover can be swung open about the hinge at the leading end of the housing, thereby deploying the fabric.

A retraction spring is disposed in the hollow interior of the housing adjacent the hinge. The retraction spring is in an unloaded position of repose when the housing is in its fully closed position and the refraction spring is in a tensioned, loaded configuration when the cover is in its partially or fully open, deployed configuration. A second latch near the leading end of the housing holds the cover open after it is fully open and a latch release is mounted near the handle. A user activates the latch release to enable the retraction spring to pull the cover back to its closed position.

The primary object of this invention is to provide a simple-to-operate rain shield for passengers entering or leaving a vehicle by providing them with an umbrella-like rain shield while a conventional umbrella is being opened or closed.

Another important object is to provide the rain shield in an aesthetically pleasing and aerodynamic form.

A more specific object is to provide a rain shield that is not limited to the space swept out by an open car door so that the protection extends beyond the trailing end of the door.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the nature and objects of the invention, reference should be made to the following detailed disclosure, taken in connection with the accompanying drawings, in which:

FIG. 1A is a top plan view of the novel structure when in its fully closed configuration;

FIG. 1B is a bottom plan view thereof when in its fully closed configuration;

FIG. 2A is a side elevation view thereof when in its fully closed configuration;

FIG. 2B is a first end view thereof when in its fully closed configuration;

FIG. 2C is a second end view thereof when in its fully closed configuration;

DETAILED DESCRIPTION OF THE PREFERRED EMBODIMENT

Figure 3:
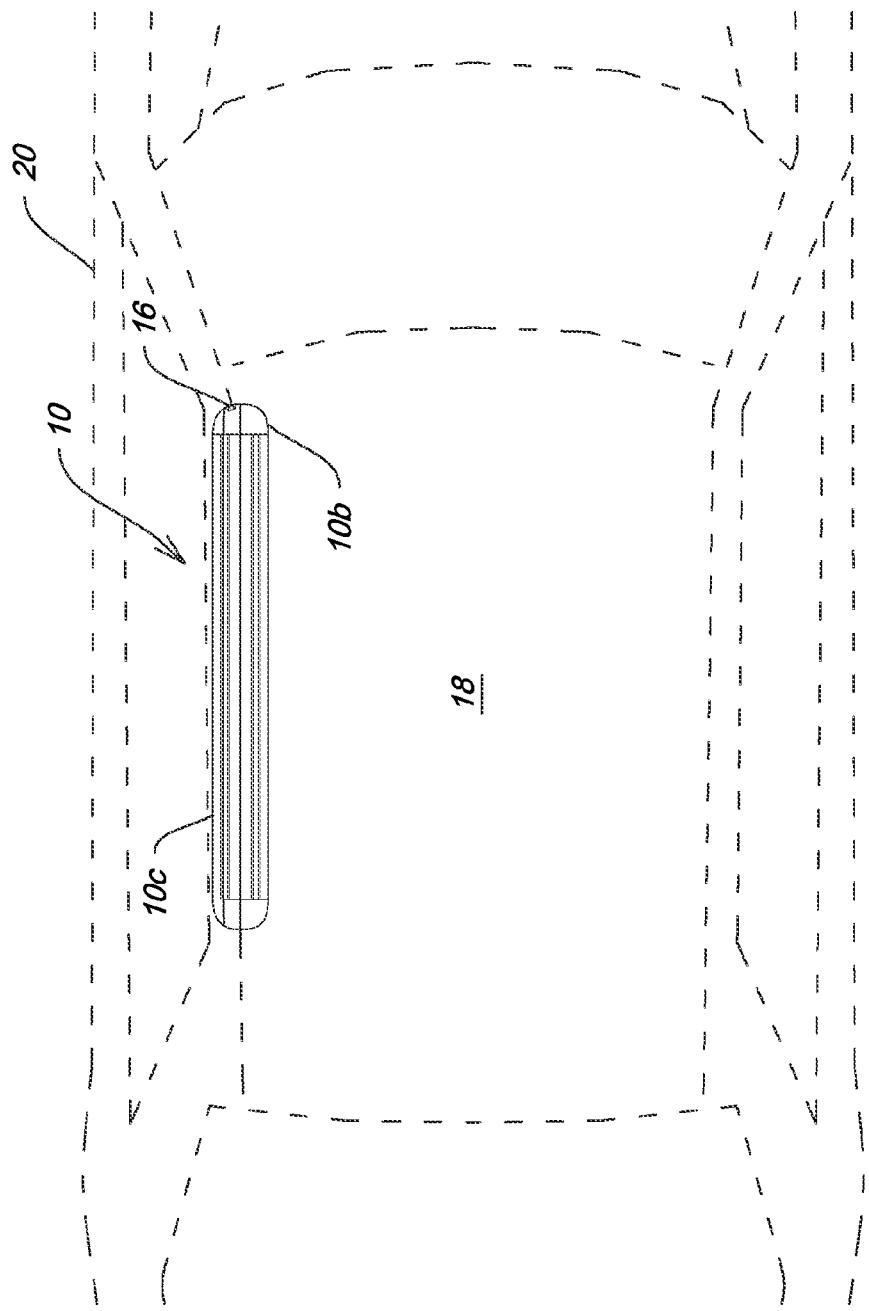
FIG. 3 is a top plan view depicting a location where the novel structure may be mounted.

FIGS. 1A and 1B depict an illustrative embodiment of the novel structure which is denoted as a whole by the reference numeral 10. Parting line 10a denotes where housing base 10b having a hollow interior engages housing cover 10c which also has a hollow interior.

Handle 12 is pivotally mounted to cover 10c in a recess formed therein.

As depicted in FIG. 1B, mounting brackets 14, 14 are secured to base 10b by screws that are depicted but not numbered to avoid cluttering the drawings. Hinge 16 is positioned inside the hollow interior of base 10b adjacent parting line 10a as depicted in FIGS. 1A and 1B. Reference numeral 17 denotes a latch release subassembly.

The same parts are depicted in the end views of FIGS. 2A, 2B and the side elevation view of FIG. 2C.

Apparatus 10 has an aesthetically appealing, streamlined appearance and can be mounted on the roof of a vehicle in several different ways. If a vehicle is equipped with a roof rack, apparatus 10 can be secured to the roof rack. Many vehicles lacking roof racks include designated points or areas of the roof where holes for roof racks may be formed. Instead of forming openings at the designated points and mounting a roof rack thereto, followed by mounting apparatus 10 to the roof rack, the user may mount apparatus 10 directly to the roof as depicted in FIG. 3. Its longitudinal axis is parallel to the longitudinal axis of the vehicle and each apparatus is mounted on an edge of the roof in close proximity to a door so that a seated passenger can deploy or retract the novel rain shield without opening the door.

Base 10b is secured to roof 18 of vehicle 20 by mounting brackets 14, 14. Hinge 16 interconnects cover 10c to base 10b at the leading end of housing 10. The leading end of housing 10 corresponds to the leading end of the vehicle which is to the right as depicted in FIG. 3, and the trailing end of housing 10 corresponds to the trailing end of the vehicle which is to the left as depicted in FIG. 3.

Figure 4:
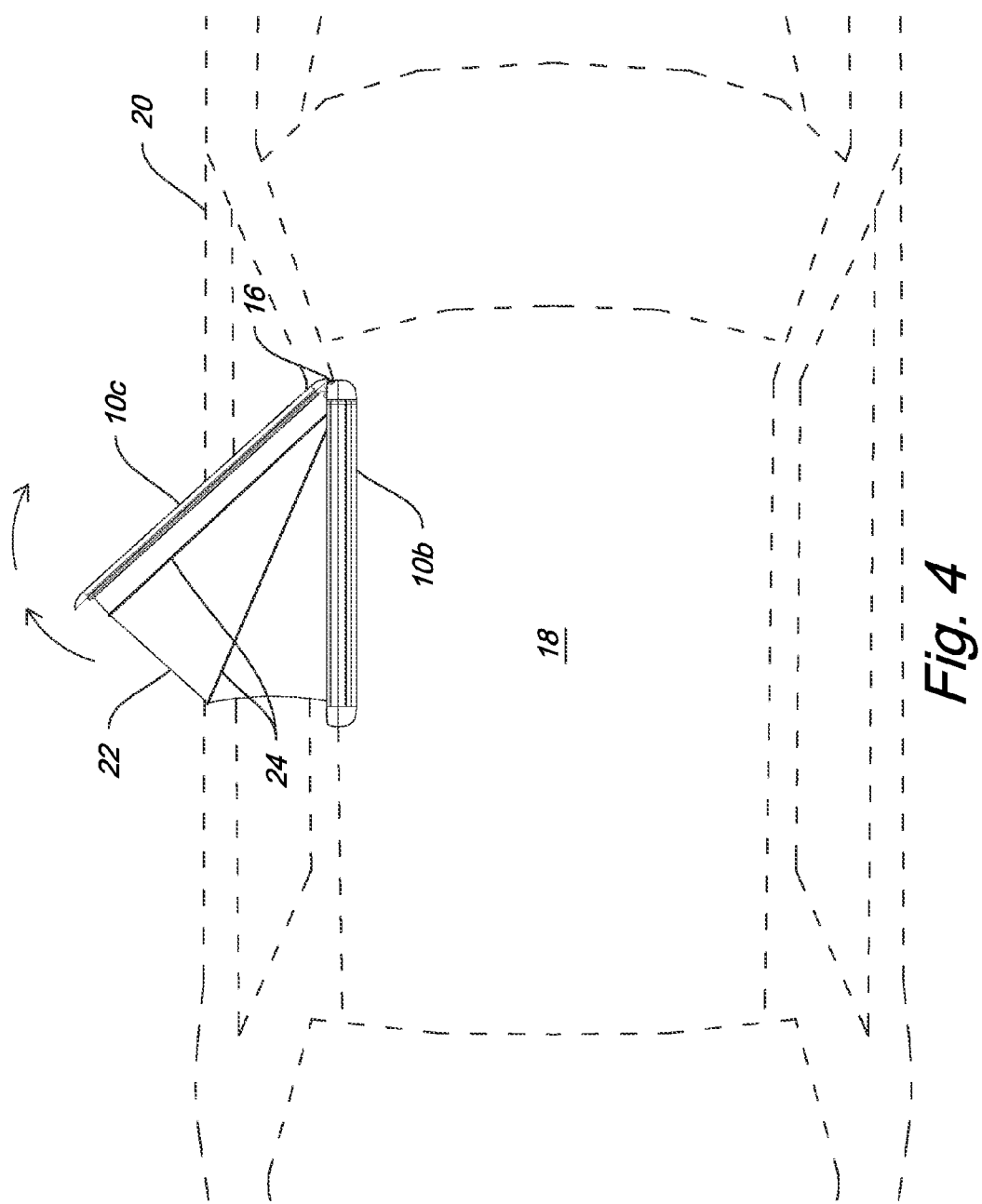
FIG. 4 is a view like that of FIG. 3 but depicting partial deployment of the novel structure.

FIG. 4 depicts housing 10 in a partially deployed configuration. The door remains closed, there being no part of the novel structure attached to a door. Fabric 22 unfolds or unwinds as cover 10c swings about hinge 16 in the direction of the un-numbered directional arrows. A first edge of fabric 22 is secured to a fixed position rod, not depicted in FIG. 4, disposed within the hollow interior of base 10b. A second edge of fabric 22 is secured to a fixed position rod, not depicted in FIG. 4, disposed within the hollow interior of cover 10c. The fabric between said first and second edges is supported from sagging by fabric support rods, collectively denoted 24, that are initially positioned within the hollow interior of base 10b and which deploy therefrom as cover 10c swings about hinge 16 as aforesaid.

In an alternative, undepicted embodiment, a first edge of the fabric is wound about an elongate rod that is mounted in base 10b for rotation about its longitudinal axis and a second edge of the fabric is secured to an elongate rod mounted in cover 10c. A torque spring may be attached to the base-mounted elongate rod and a latch may be employed to hold the cover in its open position. A latch release would enable the torque spring to return to its position of repose and cause re-winding of the fabric about the rotatably mounted elongate rod as the cover swings back to its closed position.

Figure 5:
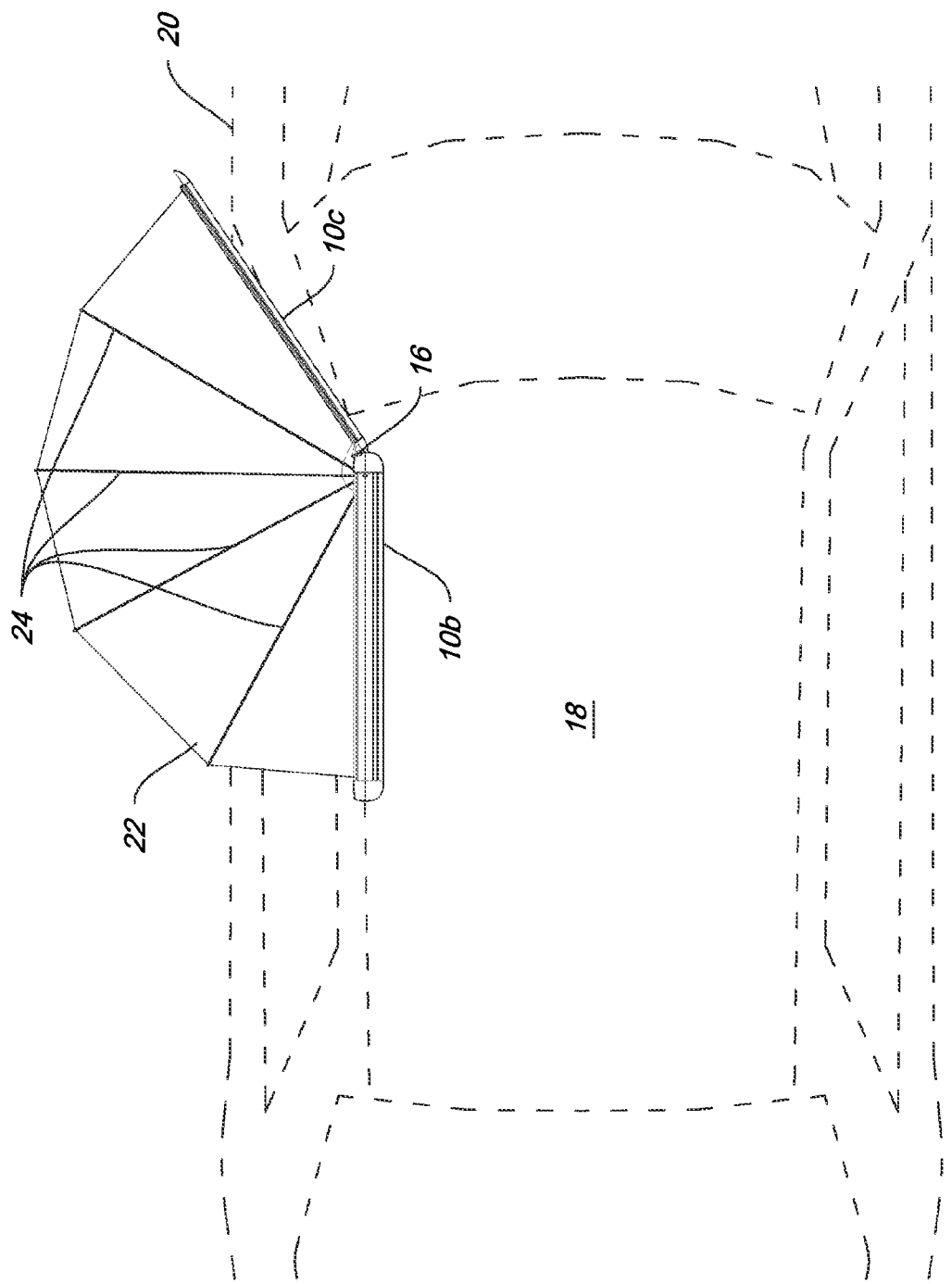
FIG. 5 is a view like that of FIG. 3 but depicting full deployment of the novel structure.

FIG. 5 depicts housing 10 in its fully deployed configuration and differs from FIG. 4 in that additional fabric support rods 24 are now deployed.

Figure 6:
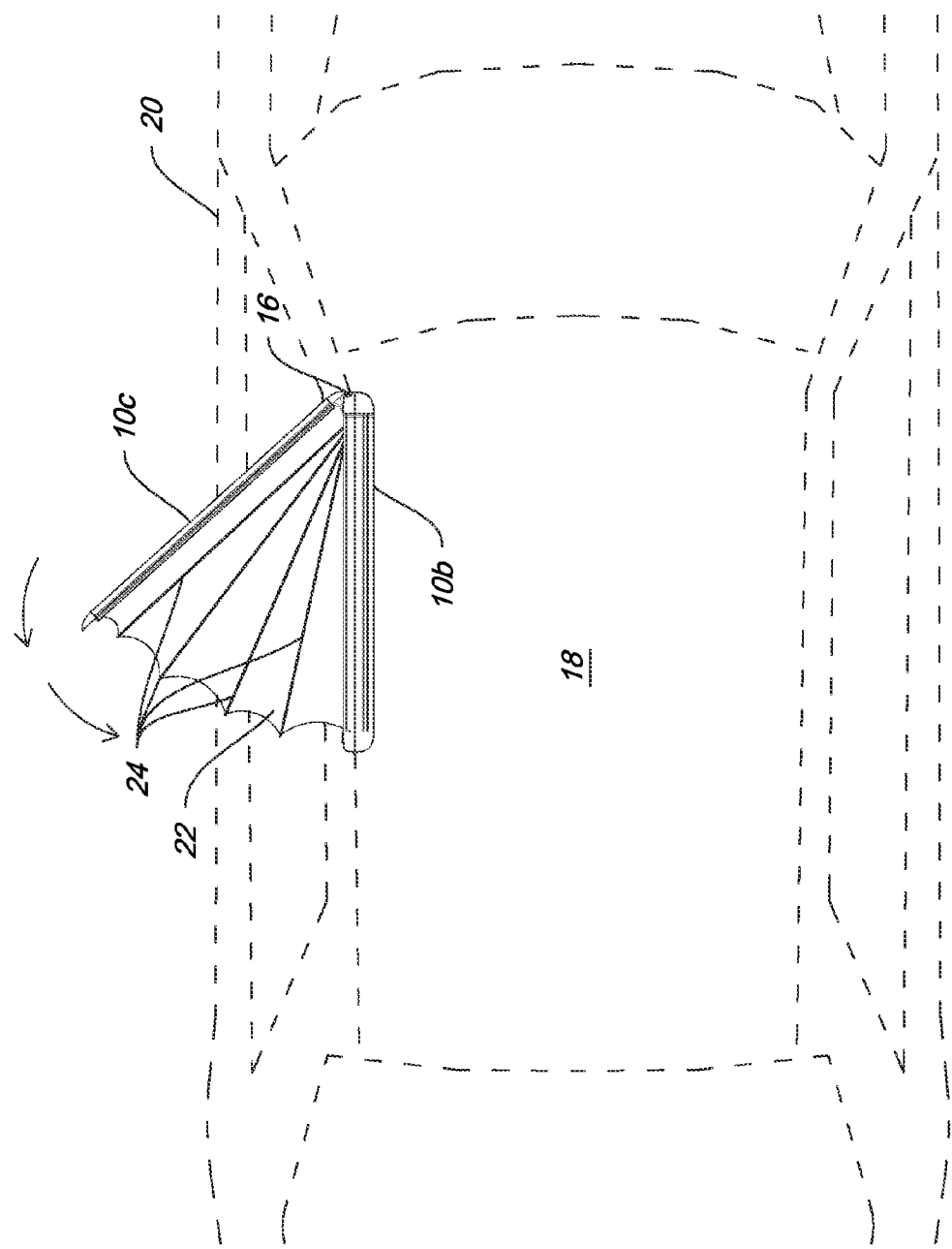
FIG. 6 is a view like that of FIG. 5 but depicting the novel structure as it is being returned to its housing.

FIG. 6 depicts the same parts as FIGS. 4 and 5 but the apparatus is now being closed, i.e., cover 10c is being swung about hinge 16 in the direction indicated by the un-numbered arrows.

Figure 7:
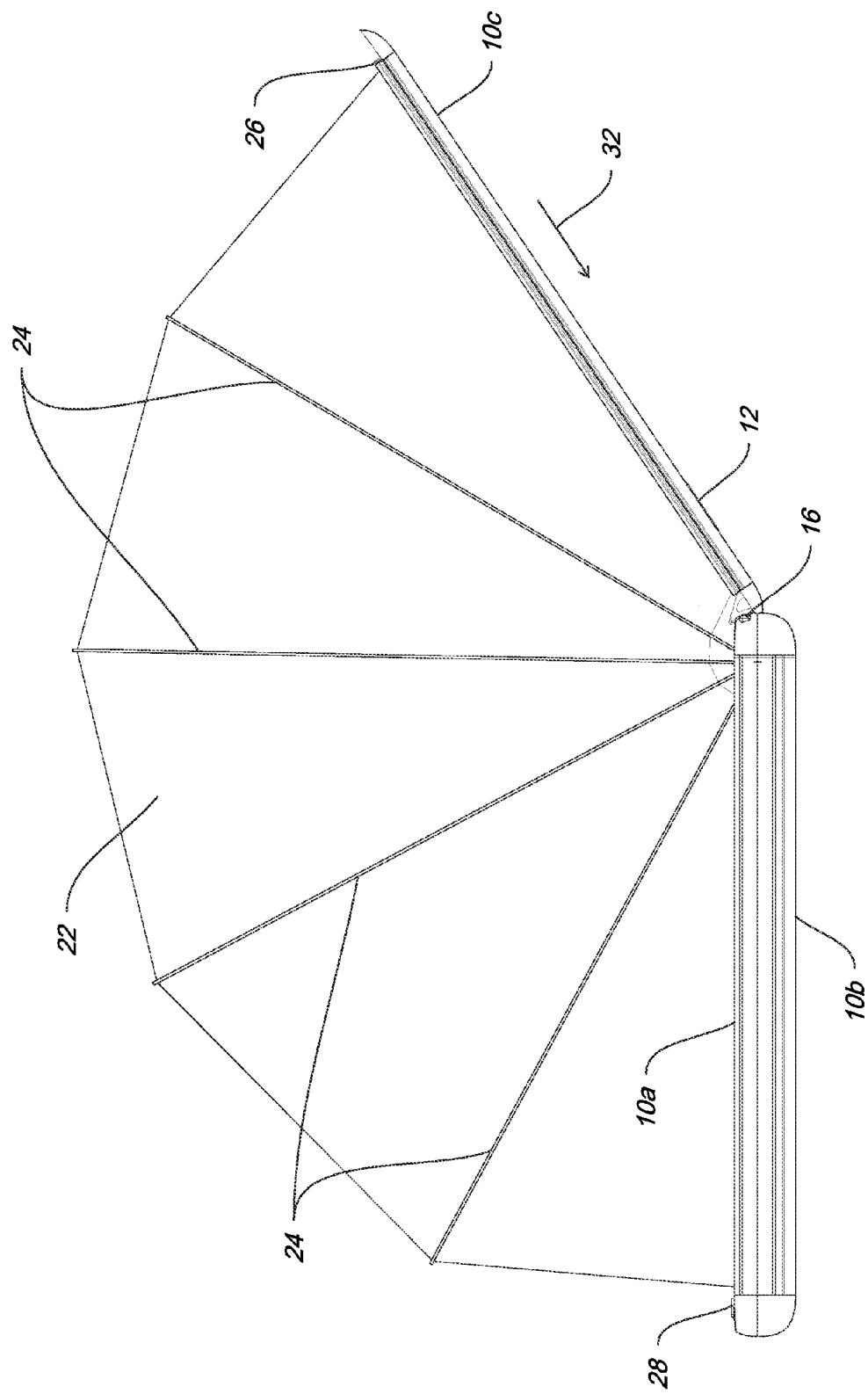
FIG. 7 is a top plan view depicting the structure in its fully deployed configuration.
Figure 12A:
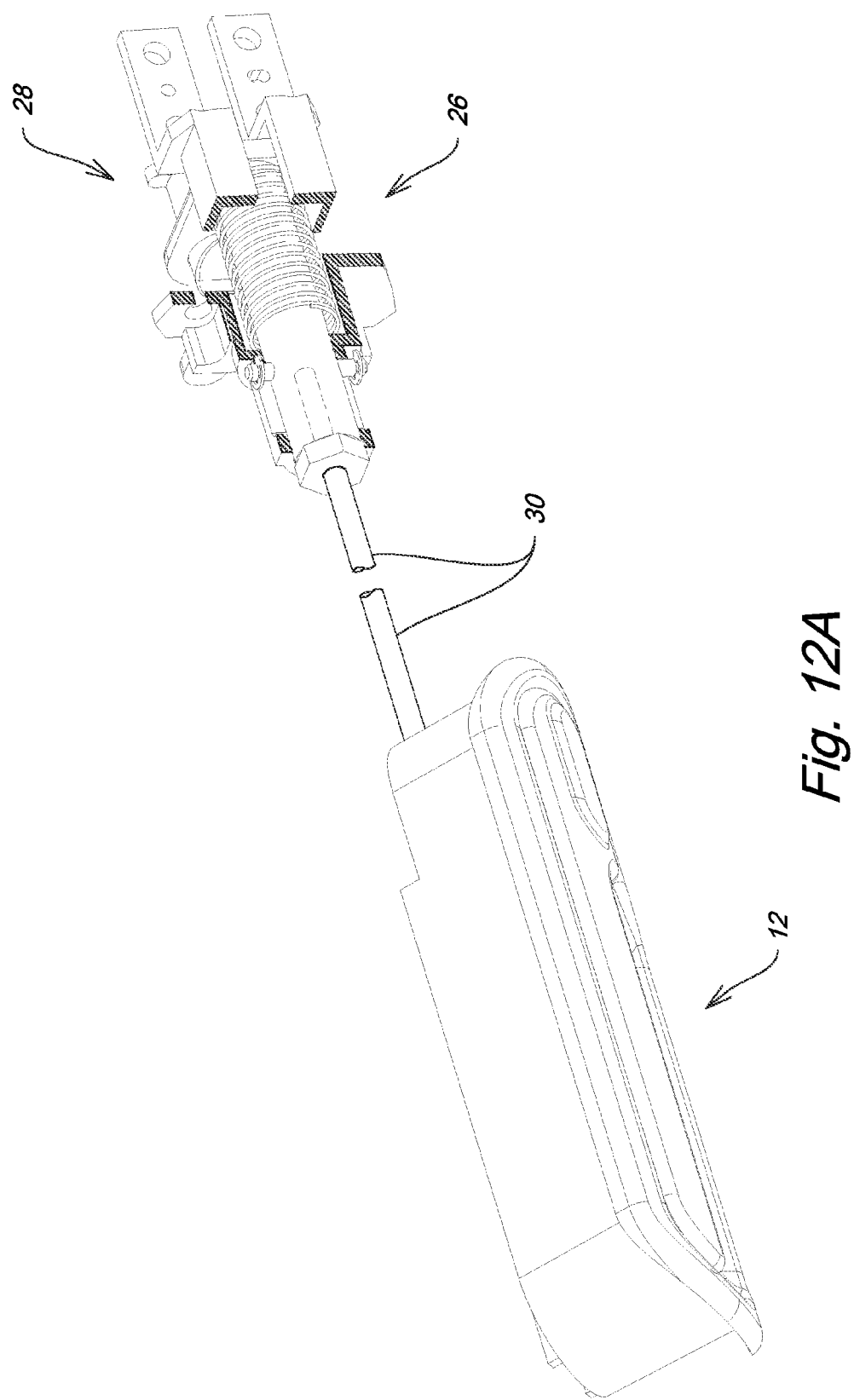
FIG. 12A depicts the novel device in its closed and locked configuration.
Figure 12B:
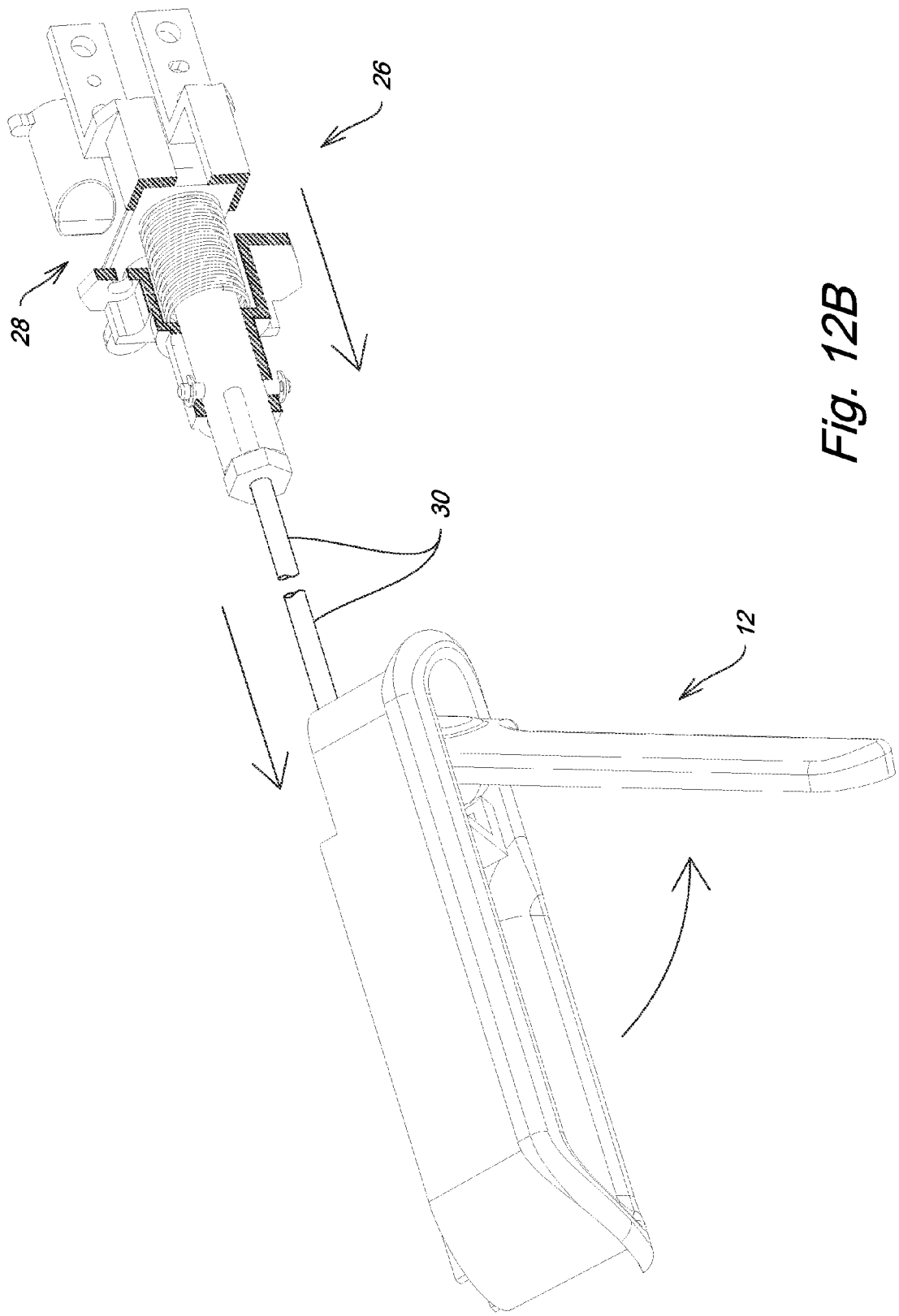
FIG. 12B depicts the novel device when the handle is activated to unlock the device.
Figure 12C:
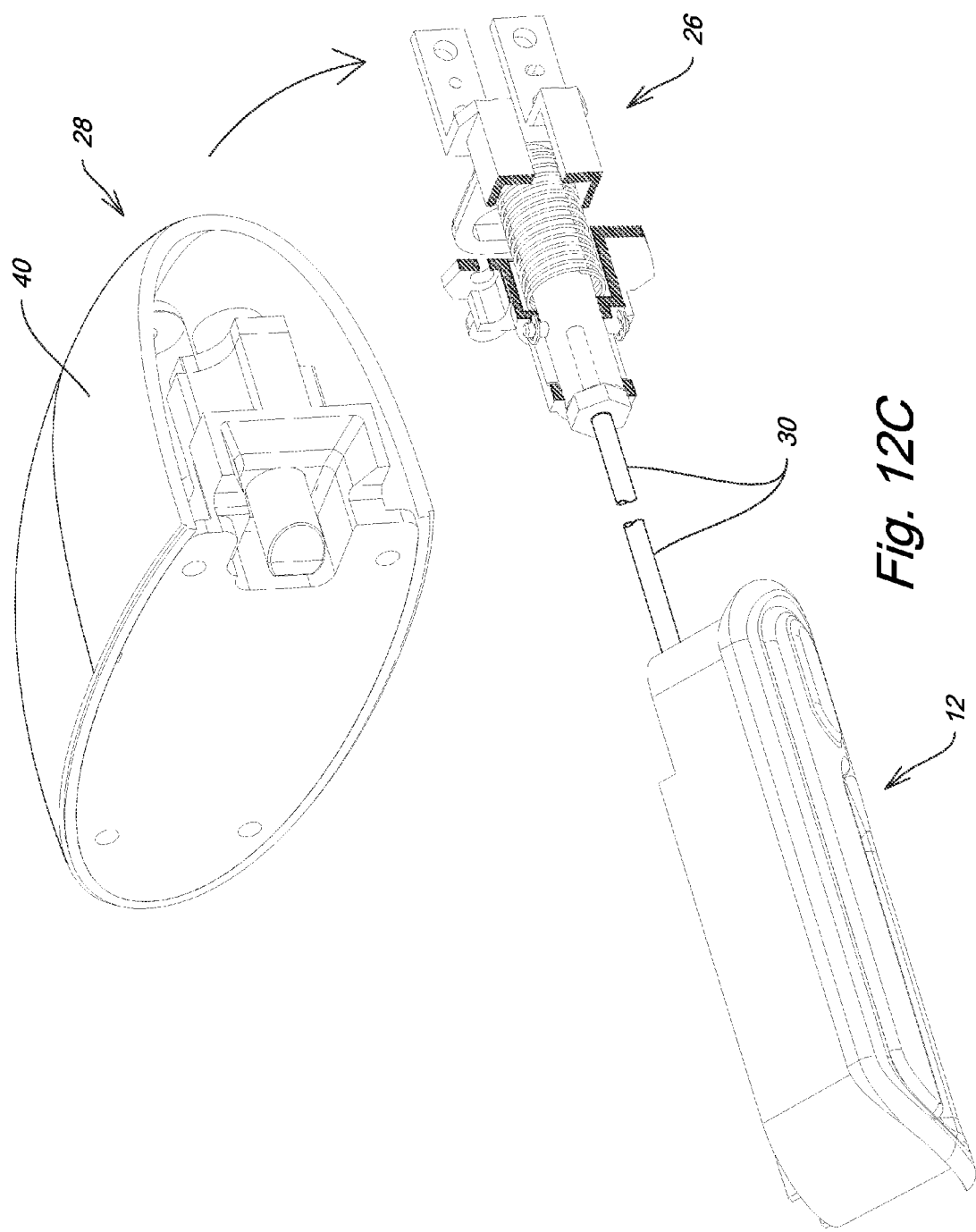
FIG. 12C is an exploded perspective view of the parts depicted in FIGS. 12A and 12B.

FIG. 7 is similar to FIG. 5 in that it depicts fabric 22 in its fully deployed configuration. Latch 26 at the trailing end of cover 10c engages catch 28 at the trailing end of base 10b when housing 10 is fully closed. Elongate rod 30, not depicted in FIG. 7, is fully housed within cover 10c and fabric 22 is not attached to it. When handle 12 is pivoted by a user, elongate rod 30 is displaced in the direction indicated by directional arrow 32 in FIG. 12A, causing latch 26 to withdraw from catch 28 so that base 10b and cover 10c can separate from one another at parting line 10a as aforesaid and as depicted in FIG. 12B. FIG. 12 C depicts the parts of FIGS. 12A and 12B in a partially exploded view to better depict how the parts are assembled. Elongate rod 30 is depicted in the exploded view of FIG. 10.

Figure 8:
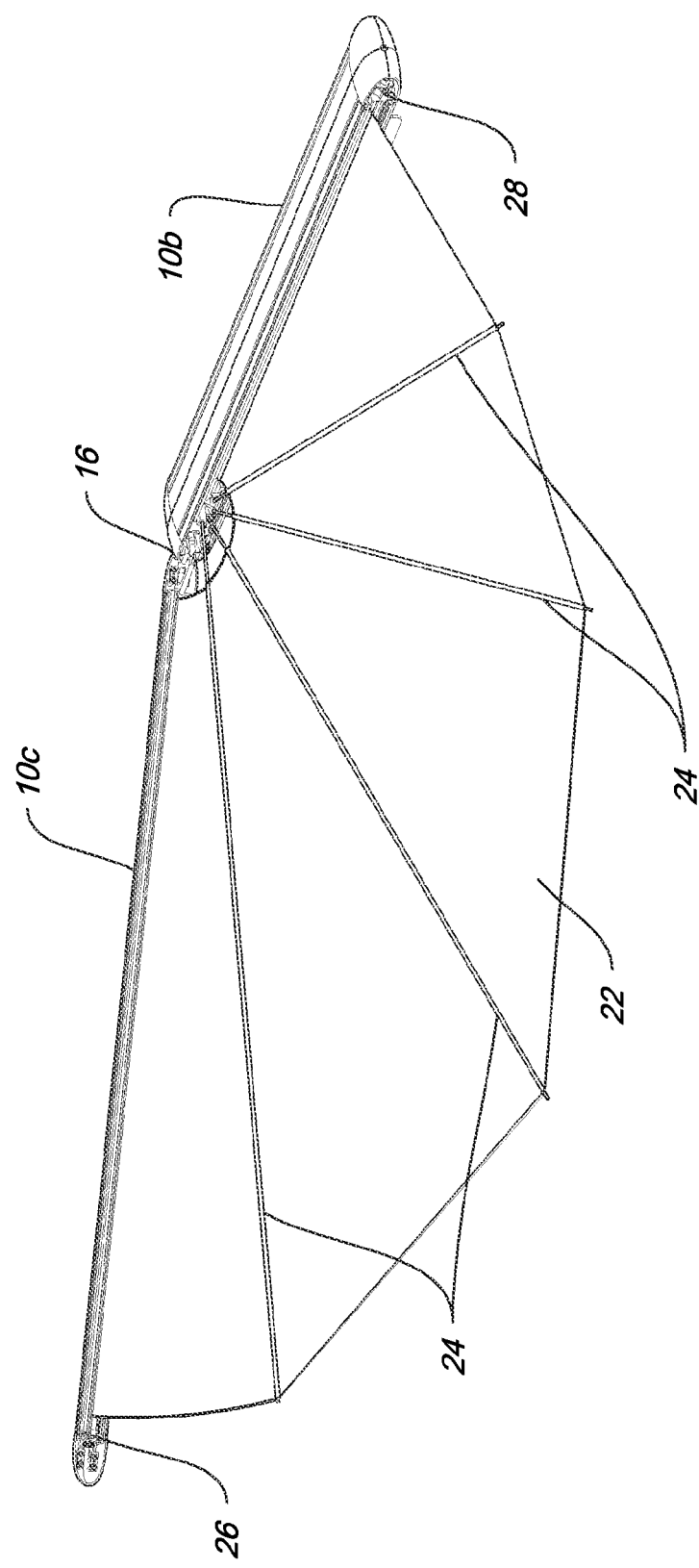
FIG. 8 is a perspective view depicting the rods that hold the fabric when in their fully deployed configuration.

FIG. 8 depicts the fully deployed configuration of housing 10.

Figure 9:
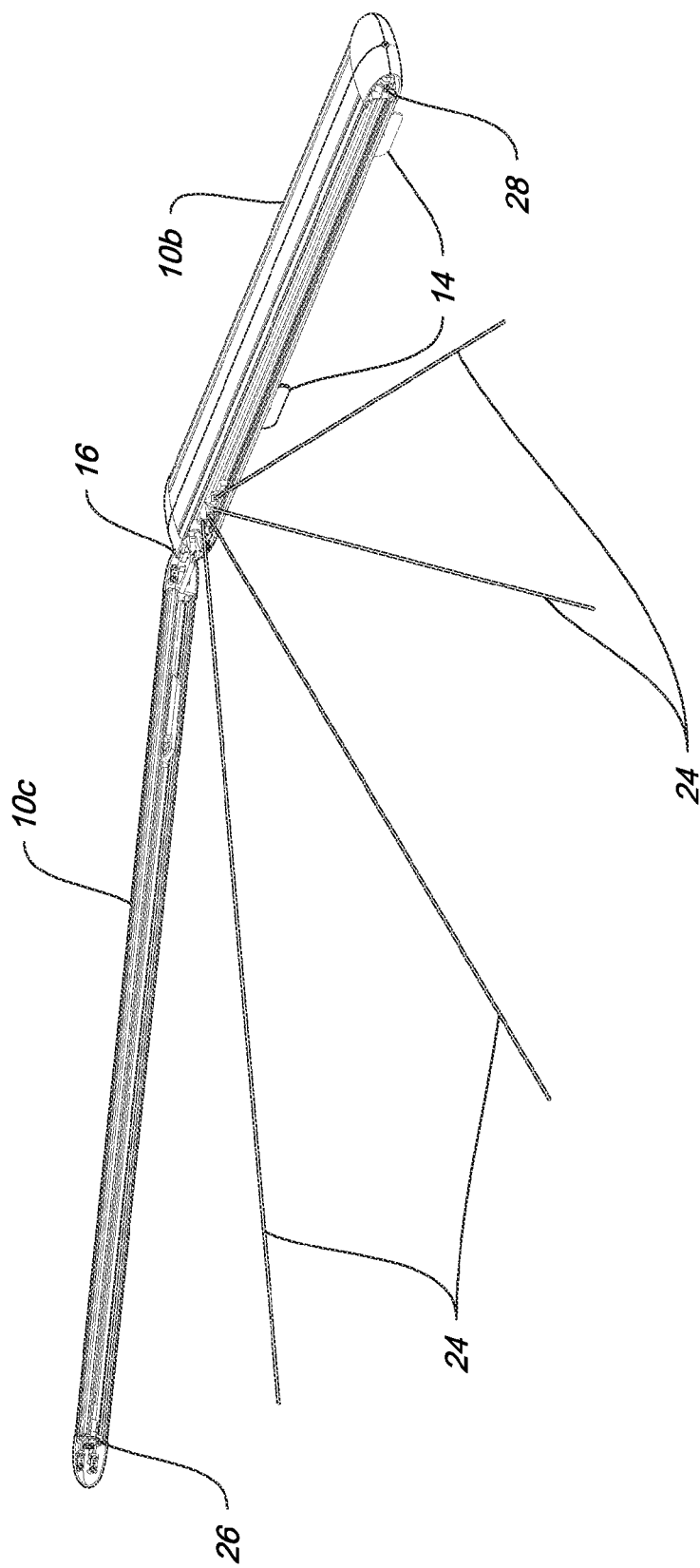
FIG. 9 is the same as FIG. 8 but without the fabric.

FIG. 9 depicts the fully deployed configuration of housing 10 with fabric 22 removed therefrom.

Figure 10:
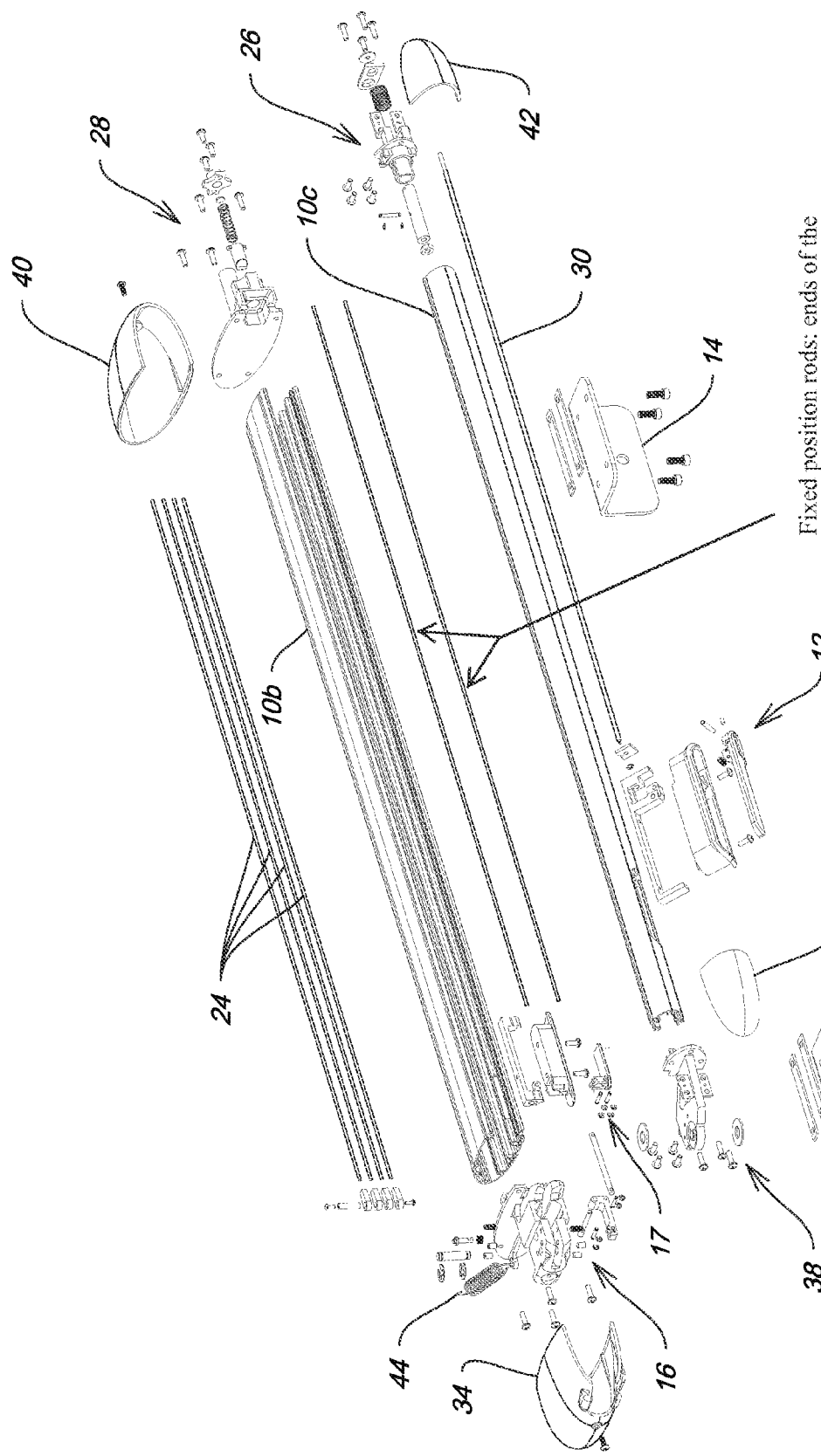
FIG. 10 is an exploded view depicting all of the parts of the preferred embodiment.

The exploded view of FIG. 10 depicts the parts in their unassembled configuration. A large number of complex parts, denoted hinge 16, together with another large number of complex parts, denoted 38, collectively form the hinge but a conventional hinge may be used as well. For purposes of clarity, parts 16 and 38 are depicted about fifty percent (50%) larger than their true relative size. There are many types of conventional hinges that may be used and all of them are within the scope of this invention as is the complex hinge that is illustrated. The complex hinge is capable of holding the cover in a first latched position when it is about one-third open, a second latched position when it is about two-thirds open, and a third latched position when it is fully open. A latch release mechanism enables the retraction spring to pivot cover 10c back to its closed position from each of said latched positions.

Another large number of complex parts, denoted latch 26, together with another large number of complex parts, denoted catch 28, collectively form the latch and catch that interconnect the respective trailing ends of base 10b and cover 10c but a conventional latch and catch may be used as well to secure the respective trailing ends of base 10b and cover 10c to one another when housing 10 is closed. For purposes of clarity, parts 26 and 28 are also depicted about fifty percent (50%) larger than their true relative size. There are many types of conventional latch and catch mechanisms, including simple snaps and buckles, for example, that may be used and all of them are within the scope of this invention as is the complex latch and catch mechanism that is illustrated.

The exact structures of latch release mechanism 17 and handle mechanism 12 that are depicted are also not critical to the invention. Any conventional latch release and handle structure is within the scope of this invention. Mechanisms 12 and 17 are also depicted about fifty percent (50%) larger than their true relative size.

Base end cap 34 houses complex hinge mechanism 16 that enables cover 10c to have stop points when fabric 22 is about one-third deployed, about two-thirds deployed, and fully deployed relative to stationary base 10b as aforesaid. However, to build an embodiment having no such stop positions, a simple, well-known hinge pin mechanism, not depicted, can be substituted for the complex mechanism.

Cover end cap 36 houses hinge block mechanism 38 which forms a part of hinge assembly 16. Base end cap 34 and cover end cap 36 abut one another when housing 10 is fully assembled.

Similarly, at the opposite end of the assembly, base end cap 40 houses catch assembly 28 and cover end cap 42 houses latch assembly 26. Base end cap 40 and cover end cap 42 abut one another when housing 10 is fully assembled.

FIG. 10 also depicts retraction spring 44 which is in its position of repose, i.e., unloaded, when base 10b and cover 10c abut one another and latch 26 is engaged to catch 28. A first end of retraction spring 44 is secured to hinge base 16a and a second end of retraction spring 44 is secured to hinge block 38 as best understood in connection with FIGS. 11A-C. Accordingly, unlatching said base and cover from one another in the manner disclosed above and swinging cover 10c to an open position causes loading of said retraction spring. As mentioned above, a latch holds the cover in each of its open configurations and latch release mechanism 17, when user-activated, releases such latch, enabling retraction spring 44 to return to its position of repose, pulling cover 10b closed as it does so.

Figure 11A:
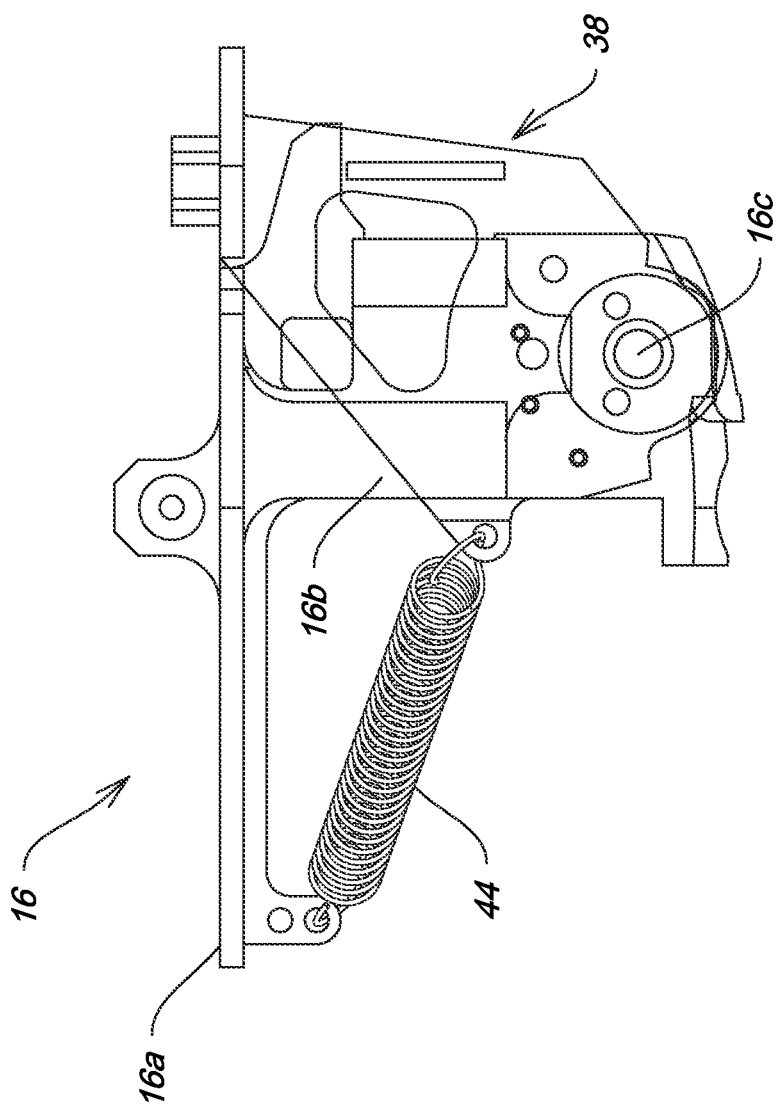
FIG. 11A is a top plan view of the novel hinge mechanism when the novel apparatus is in its fully closed position.

More particularly, FIG. 11A is a top plan view of the novel hinge mechanism when the novel apparatus is in its fully closed position. Hinge 16 includes hinge base 16a which is secured to housing base 10b. Hinge arm 16b is formed integrally with hinge base 16a and hinge post 16c is a part of the hinge arm 16b assembly. Hinge block mechanism, denoted 38 as a whole, is secured to housing cover 10c and pivots about hinge post 16c when said cover 10c is at least partially open. Retainer spring 44 is in its position of repose when cover 10c is fully closed.

Figure 11B:
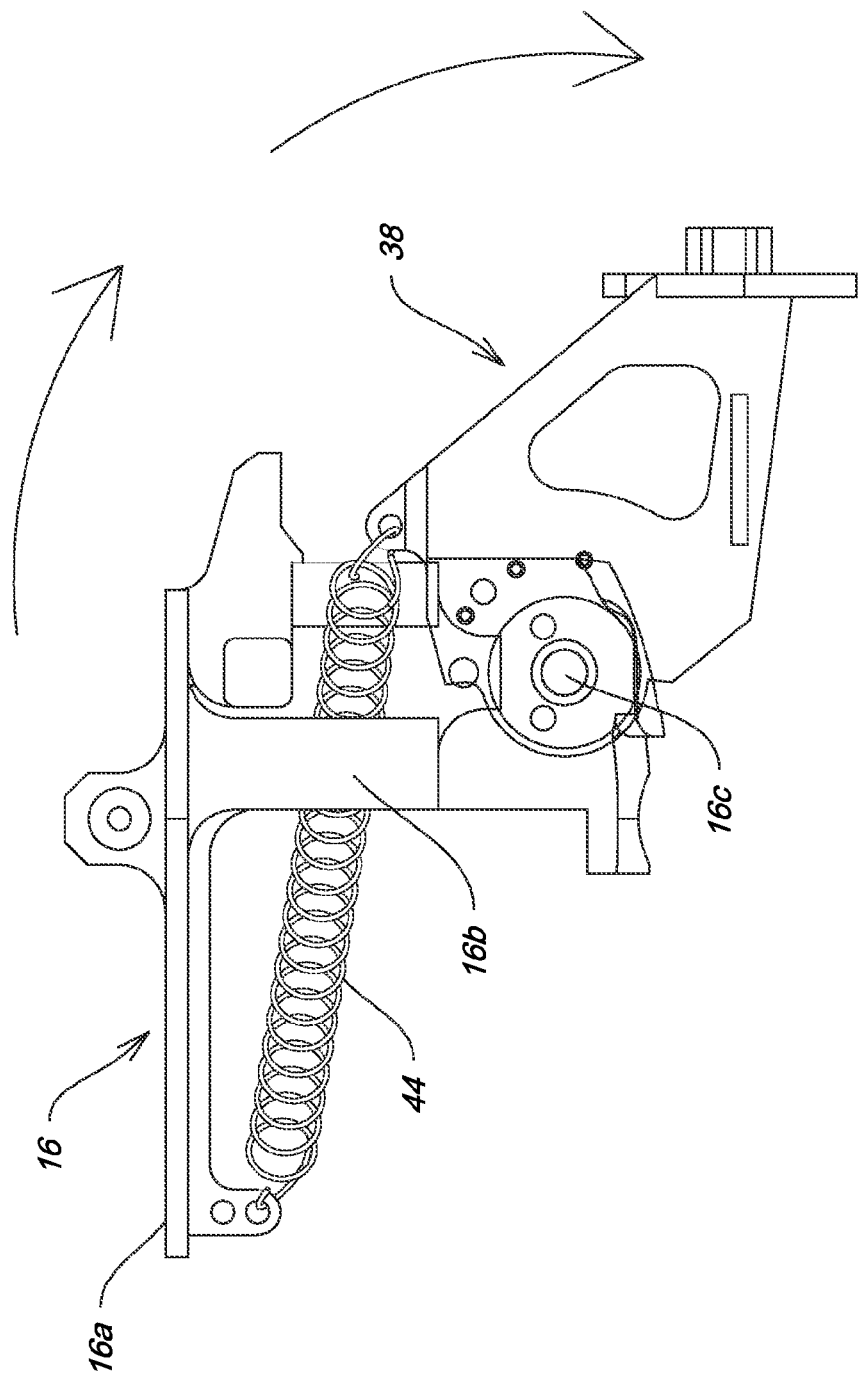
FIG. 11B is a top plan view of the novel hinge mechanism when the novel apparatus is open about ninety degrees (90) relative to its fully closed position.

FIG. 11B is a top plan view of the novel hinge mechanism when the novel apparatus is open about ninety degrees (90°) relative to its fully closed position. Retainer spring 44 is now under tension and extends horizontally under part of hinge arm 16b and over other parts of said hinge arm 16b as depicted. In a preferred embodiment, a first system of detents holds cover 10c in this ninety degree (90°) open position, i.e., the detents are sufficiently strong to overcome the tension of retainer spring 44. The detents preferably take the form of convexities formed in hinge base 16b that align with and enter into concavities formed in hinge block mechanism 38 or the reverse i.e., the concavities may be formed in hinge base 16a and the convexities in hinge block mechanism 38.

Figure 11C:
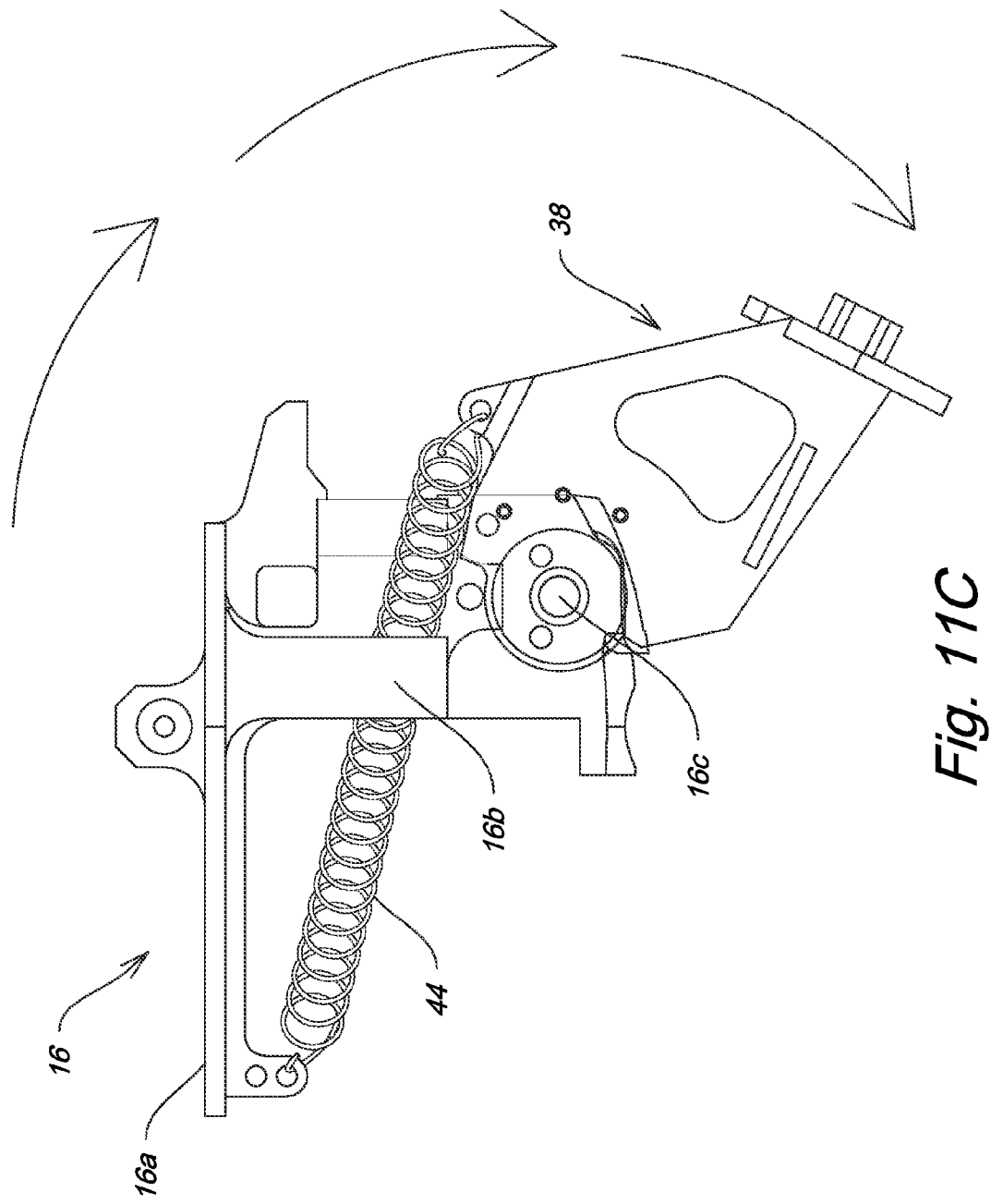
FIG. 11C is a top plan view of the novel hinge mechanism when the novel apparatus is open about one hundred sixty degrees (160) relative to its fully closed position.

FIG. 11C is a top plan view of the novel hinge mechanism when the novel apparatus is open about one hundred sixty degrees (160) relative to its fully closed position. Retainer spring 44 is now under maximum tension. A second set of detents, working in the same way as said first set of detents, is sufficiently strong to resist such tension.

When it is desired to close cover 10c, the strength of the detents is easily overcome by manual closing of said cover.

The output shaft of a two-direction motor, not depicted, may be secured to hinge post 16c either directly or through a suitable speed-reduction means to enable a user to open and close housing cover 10c relative to stationary housing base 10b by switching the motor on and then selecting "open" or "close." The "open" setting would include a sub-setting of ninety degrees (90°) open or one hundred sixty degrees (160°) open, for example. No detents would be required in the motorized embodiment. There would be no need for a latch for holding the cover open nor would a latch release mechanism be required. A motorized version would be remotely activated and the handle would not need to be rotated in order to deploy the device.

It will thus be seen that the objects set forth above, and those made apparent from the foregoing disclosure, are efficiently attained and since certain changes may be made in the above construction without departing from the scope of the invention, it is intended that all matters contained in the foregoing disclosure or shown in the accompanying drawings shall be interpreted as illustrative and not in a limiting sense.

It is also to be understood that the following claims are intended to cover all of the generic and specific features of the invention herein disclosed, and all statements of the scope of the invention that, as a matter of language, might be said to fall therebetween.

What is claimed is:

1. An apparatus that provides protection from precipitation if needed to a vehicle occupant upon entering or exiting from the vehicle, comprising:
    an elongate, streamlined housing having a leading end and a trailing end that correspond to a leading and trailing end of said vehicle;
    said housing having a longitudinal axis parallel to a longitudinal axis of the vehicle;
    said housing adapted to be secured to the roof of said vehicle near an edge of said roof in proximity to a vehicle door so that the housing can be reached by a passenger seated within said vehicle;
    said housing including a hollow base and a hollow cover;
    said hollow base adapted to be secured to said vehicle roof;
    a hinge positioned at the leading end of said housing, said hinge interconnecting said hollow cover and said hollow base;
    said housing having a fully closed position when said hollow cover is fully engaged to said hollow base;
    said housing having a fully open position when said hollow cover is fully rotated with respect to said base;
    a sheet of waterproof material having a first end secured to an interior of said hollow base and a second end secured to an interior of said hollow cover;

said sheet being in a stored configuration when said housing is in said fully closed position, said sheet being fully deployed when said housing is in said fully open position;
a catch secured to a trailing end of said base;
a latch secured to a trailing end of said cover;
said latch engaging said catch when said housing is in said fully closed configuration;
a handle disposed at a leading end of said housing, said handle having a position of repose and a position of non-repose;
an elongate rod disposed in said housing;
a first end of said elongate rod connected to said handle;
a second end of said elongate rod connected to said latch and catch when said housing is in said fully closed position;
said handle, when displaced from its position of repose to its position of non-repose, displacing said elongate rod along a longitudinal axis of symmetry;
said displacement of said elongate rod releasing said latch from said catch so that said cover may be pivoted about said hinge and swung away from said base.

2. The apparatus of claim 1, further comprising:
said first end of said waterproof material secured to a fixed position rod disposed within said interior of said hollow base; and
said second end of said waterproof material secured to a fixed position rod disposed within said hollow interior of said hollow cover.

3. The apparatus of claim 2, further comprising:
said hinge including a hinge base secured to said housing base and a hinge block mechanism secured to a housing cover;
a refraction spring having first end secured to said hinge base and a second end secured to said hinge block mechanism;
said retraction spring being in a position of repose configuration when said housing is in said fully closed position and said handle is in said position of repose;
said retraction spring being in a tensioned, loaded configuration when said housing cover is pivoted relative to said housing base; and
said handle being adapted to be displaced from said position of repose by a passenger seated in said vehicle.

4. The apparatus of claim 3, further comprising:
a first set of detents formed in said hinge base and in said hinge block;
said first set of detents formed in said hinge base aligning with and engaging said first set of detents formed in said hinge block when said hinge cover is in a first open position relative to said hinge base;
said first set of detents, when said hinge cover is in said first open position relative to said hinge base, overcoming a retraction bias exerted by said retainer spring so that a user need not hold said housing cover in said first open position.

5. The apparatus of claim 4, further comprising:
a second set of detents formed in said hinge base and in said hinge block;
said second set of detents formed in said hinge base aligning with and engaging said second set of detents formed in said hinge block when said hinge cover is in a second open position relative to said hinge base;
said second set of detents, when said hinge cover is in said second open position relative to said hinge base, overcoming a retraction bias exerted by said retainer spring so that a user need not hold said housing cover in said second open position.

\* \* \* \* \*

UNITED STATES PATENT AND TRADEMARK OFFICE
CERTIFICATE OF CORRECTION

| | | |
|---|---|---|
| PATENT NO. | : 9,090,153 B1 | Page 1 of 1 |
| APPLICATION NO. | : 14/269913 | |
| DATED | : July 28, 2015 | |
| INVENTOR(S) | : Michael Boyd | |

It is certified that error appears in the above-identified patent and that said Letters Patent is hereby corrected as shown below:

In the Claims

Column 7, Claim 3, Line 33 should read:

a retraction spring having first end secured to said hinge

Signed and Sealed this
Fifteenth Day of December, 2015

Michelle K. Lee
*Director of the United States Patent and Trademark Office*